Jan. 20, 1953        E. B. FERNBERG        2,626,080
CLOSURE DEVICE FOR APERTURES

Filed Feb. 26, 1948        2 SHEETS—SHEET 1

Inventor
Eric B. Fernberg
By
Attorney

Jan. 20, 1953　　　　　E. B. FERNBERG　　　　2,626,080
CLOSURE DEVICE FOR APERTURES
Filed Feb. 26, 1948　　　　　　　　　　　2 SHEETS—SHEET 2
FIG. 5　　　　　FIG. 6
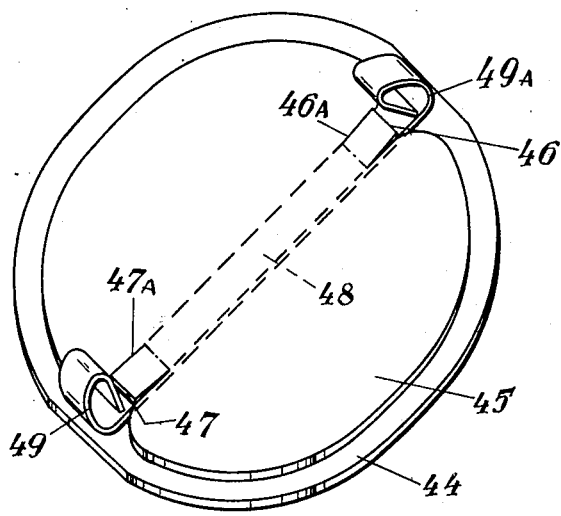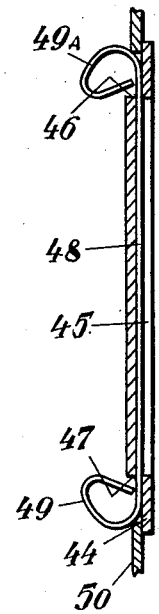
FIG. 7　　　　　FIG. 8
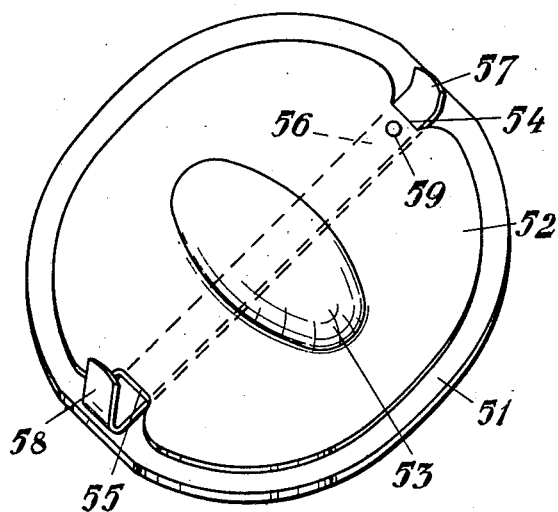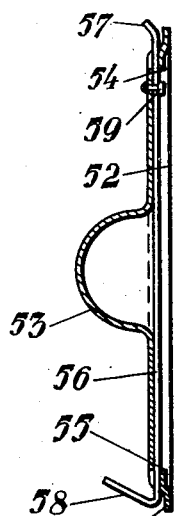
Inventor
Eric B. Fernberg
By Malcolm W. Fraser
Attorney Patented Jan. 20, 1953

2,626,080

UNITED STATES PATENT OFFICE 2,626,080

CLOSURE DEVICE FOR APERTURES

Eric Birger Fernberg, Pinner, England

Application February 26, 1948, Serial No. 11,197
In Great Britain October 17, 1945

Section 1, Public Law 690, August 8, 1946
Patent expires October 17, 1965

1 Claim. (Cl. 220—25)

The present invention relates to closure devices for apertures and has particular, although not exclusive, reference to cover plates for apertures formed in sheet-like members such as sheet metal bodies of motor vehicles.

It is frequently necessary to make small apertures in the sheet metal body of a motor vehicle for a variety of purposes connected with the manufacture, and before a body is completed it is desirable to cover these apertures in order to prevent dust, water or moisture from entering the box-like interior of the body. It is an object of the present invention to provide an improved such closure or cover plate.

Figure 1:
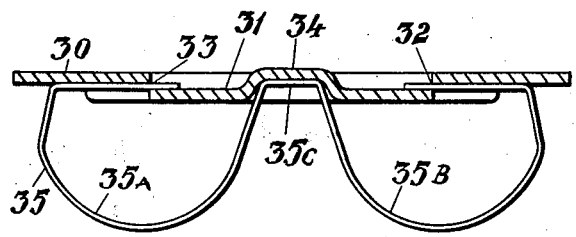
Figure 2:
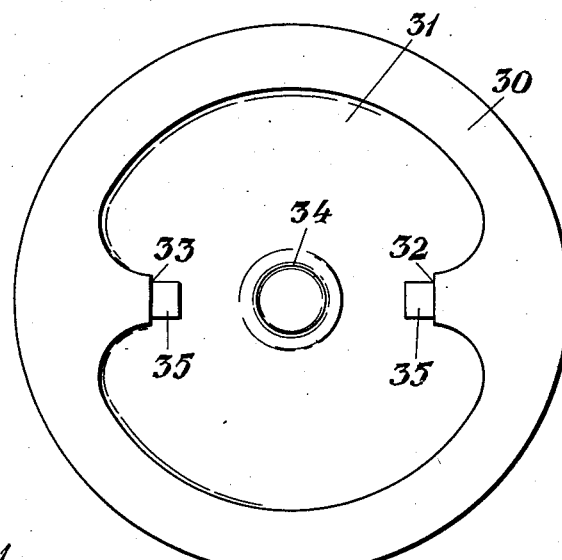
Figure 3:
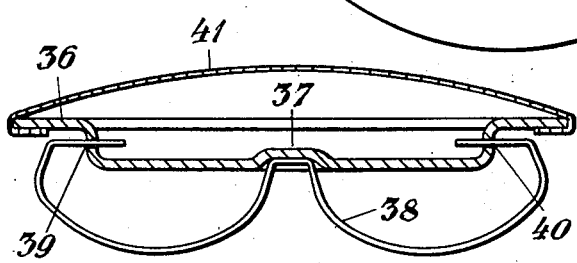
Figure 4:
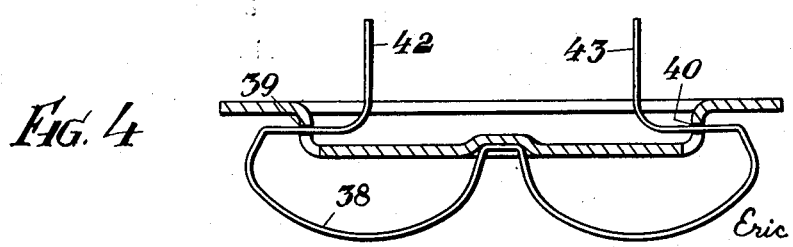

Reference will now be made to the accompanying diagrammatic drawings which illustrate by way of example preferred embodiments of the invention and in which:

Figure 1 is a sectional elevation of a closure device constructed in accordance with the present invention, Figure 2 is a plan of the closure shown in Figure 1, Figures 3 and 4 are sectional elevations of two other embodiments of the invention, Figure 5 is a perspective view of yet another embodiment, Figure 6 is a sectional elevation of the device shown in Figure 5, whilst Figures 7 and 8 are perspective and sectional views respectively of a still further embodiment of the invention.

The closure device illustrated in Figures 1 and 2 is designed to cover a circular aperture in a substantially plane sheet-like member such as a pressed steel vehicle body.

It comprises a circular metal cover plate 30 formed with a recess 31 having in its walls two diametrically opposed parallel slots 32 and 33. In the centre of the trough 31 is a circular raised cap 34. Beneath the recess 31, and extending over a diameter thereof, is a convexly bowed leaf spring 35 each end of which fits into one of the diametrically opposed slots 32 and 33. The spring 35 is formed of a strip of spring steel and is bent into shape of two bowed loops 35A and 35B with a connecting bridge 35C, the underside of the cap 34 receiving the bridge 35C.

When it is desired to close the aperture, the spring 35 is snapped into the aperture with which the recess 31 registers and the pressure of the spring then holds the plate 30 firmly in position.

A modification of the last described embodiment especially suitable as a closure for cans, bottles or the like is shown in Figure 3 and comprises a circular metal cover plate 36 formed with a circular central trough 37 which registers with the aperture to be closed, each end of a bowed spring 38 passing through one of two diametrically opposed parallel slots 39 and 40 in the walls of the recess. A facing head 41 is secured over the lip of the cover plate 36 thereby presenting an improved appearance.

Figure 4 illustrates a modification of the last described closure device in which the facing head is omitted and two ends of a leaf spring 38 are bent upwards to form handles 42 and 43, the spring 38 being contracted by closing the two handles together so that the device is easily releasable.

The closure device illustrated in Figures 5 and 6 comprises an elliptical steel cover plate 44 formed with a recess 45, which has substantially the profile of the aperture to be closed, and two diametrically opposed parallel slots 46 and 47 in its walls. A strip 48 of spring steel extends along the floor of the recess 45 and its two ends pass out through the slots 46 and 47 and are bowed to form two loops 49 and 49A. In use the two loops 49 and 49A are snapped through an aperture in a piece of sheet metal 50 (Figure 6) and the plate 44 is then held securely over the aperture. In order that the spring 48 may be inserted through the slots 46 and 47, two tongues 46A and 47A are formed by shearing through the metal. The tongues are bent back while the spring 48 is being fitted and are then flattened to the position illustrated in Figure 5.

Another embodiment is illustrated in Figures 7 and 8. In this arrangement, a closure device comprises an elliptical steel cover plate 51 formed with a recess 52 in which is formed a central depression or well 53. Extending diametrically across the bottom of the recess 52, and out through slots 54 and 55 in the walls thereof, is a strip 56 of spring steel. One tip 57 of the strip 56 is bent at a small angle away from the lip of the plate 51 whilst the other end is curved over as at 58. The central well 53 enables the fingers or a tool to be inserted beneath the spring 56 so that it can be raised, thereby drawing the end 58 towards the end 57 and freeing the device. In assembling the cover plate, the strip 56 is threaded, end 57 first, through slot 55, then through slot 54 after which the strip is riveted, welded or staked to the plate as at 59.

It will be appreciated that the plates 44 and 51 may be of shapes other than elliptical.

It will also be appreciated that any of the above described closure devices may be fitted with a facing head of the kind illustrated in Figure 3, whilst a handle or knob may be secured to such a facing head or to the spring.

In the following claim a "recess" is to be understood as extending away from the cover plate towards the structure on which the device is used.

I claim:

A removable closure device for covering an aperture, including a cover plate formed with a rim, a recess enclosed by the rim, a pair of diametrically opposed slots in the walls of the recess, a leaf spring having its respective ends threaded through the two slots so that the major part of the spring lies on one face of the plate and the two ends lie on the other face, and a portion of the spring extending away from the underside of the rim being bowed downwardly and inwardly and providing a curved portion which can be resiliently snapped over an edge of the aperture to be covered and forms with the rim a V-shaped mouth in which the edge may be gripped.

ERIC BIRGER FERNBERG.

REFERENCES CITED

The following references are of record in the file of this patent:

UNITED STATES PATENTS

| Number | Name | Date |
|---|---|---|
| 518,554 | Stoker | Apr. 17, 1894 |
| 1,107,490 | Butts | Aug. 18, 1914 |
| 1,477,043 | Drake | Dec. 11, 1923 |
| 1,573,279 | Silveira | Feb. 16, 1926 |
| 1,875,907 | Zarobsky | Sept. 6, 1932 |
| 2,083,056 | Cox | June 8, 1937 |
| 2,088,848 | Troy | Aug. 3, 1937 |
| 2,156,110 | Brukner | Apr. 25, 1939 |
| 2,412,872 | Clark, Jr. | Dec. 17, 1946 |